United States Patent

Armanno, Sr.

[11] Patent Number: 5,401,924
[45] Date of Patent: Mar. 28, 1995

[54] REMOTE BATTERY SWITCH

[76] Inventor: Frank Armanno, Sr., 14399 Picea Ct., Ft. Pierce, Fla. 34951

[21] Appl. No.: 186,552

[22] Filed: Jan. 26, 1994

[51] Int. Cl.⁶ .................. H01H 1/22; H01H 17/08
[52] U.S. Cl. .................. 200/244; 200/43.010;
200/250; 200/543; 200/566; 307/10.2
[58] Field of Search ............ 200/43.01, 43.11, 43.16,
200/52 R, 61.58, 61.87, 61.89, 244, 246, 250,
321, 325, 331, 335, 332, 509, 543, 544, 566,
DIG. 17, DIG. 26, 413, 419, 420, 423;
307/10.3, 10.4, 10.5, 10.6, 10.7; 180/68.5;
335/167, 168, 169, 170, 171, 205

[56] References Cited

U.S. PATENT DOCUMENTS

| | | | |
|---|---|---|---|
| 2,277,671 | 6/1940 | Williams et al. | 307/10.7 |
| 2,515,819 | 7/1950 | Bourne | 307/10.7 |
| 2,545,965 | 3/1951 | McCamon | 200/543 |
| 2,570,704 | 10/1951 | Pelletier | 200/543 |
| 2,953,660 | 9/1960 | Bohn | 335/205 |
| 3,692,965 | 9/1972 | Gardner | 200/43.07 |
| 3,760,617 | 9/1973 | Westerdale | 70/1.5 |
| 3,820,361 | 6/1974 | Leitner | 70/241 |
| 4,515,237 | 5/1985 | Gonzalez et al. | 180/287 |
| 4,993,244 | 2/1991 | Osman | 70/30 |

Primary Examiner—Henry J. Recla
Assistant Examiner—Peter S. Hrycko
Attorney, Agent, or Firm—Richard C. Litman

[57] ABSTRACT

A remote battery switch for motor vehicles provides for the remotely controlled disconnection and connection of the vehicle electrical system, for long term storage or carjacking threats. The switch attaches directly to the side terminal or top post connector of a standard motor vehicle battery, without further need for additional structural attachment. A cord or cable is run from the battery switch to the vehicle passenger interior, and is preferably discreetly accessible by the vehicle operator should the need arise. The cord or cable serves to open the switch by releasing a magnetic contact and withdrawing the magnetic switch bar against a spring, whereupon the switch bar is caught and retained by a double acting catch. A second pull on the cord releases the catch, whereupon the spring pulls the magnetic switch bar into magnetic contact with the other switch point to close the circuit. Thus, the switch may be remotely opened and closed using purely tensile forces in the cord.

7 Claims, 3 Drawing Sheets

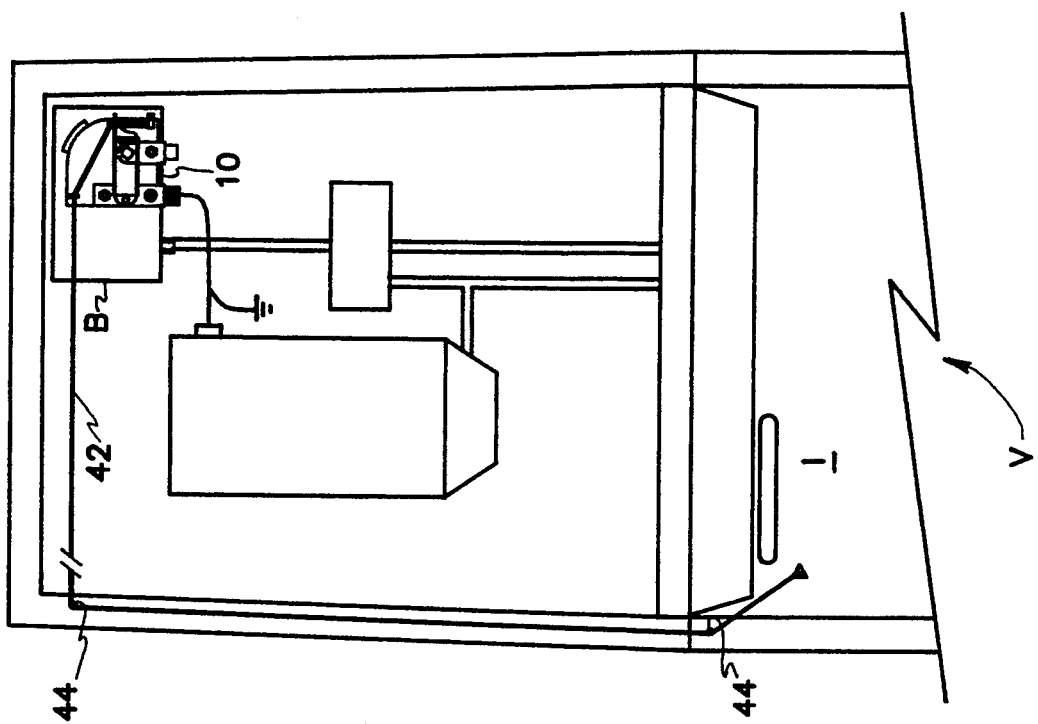
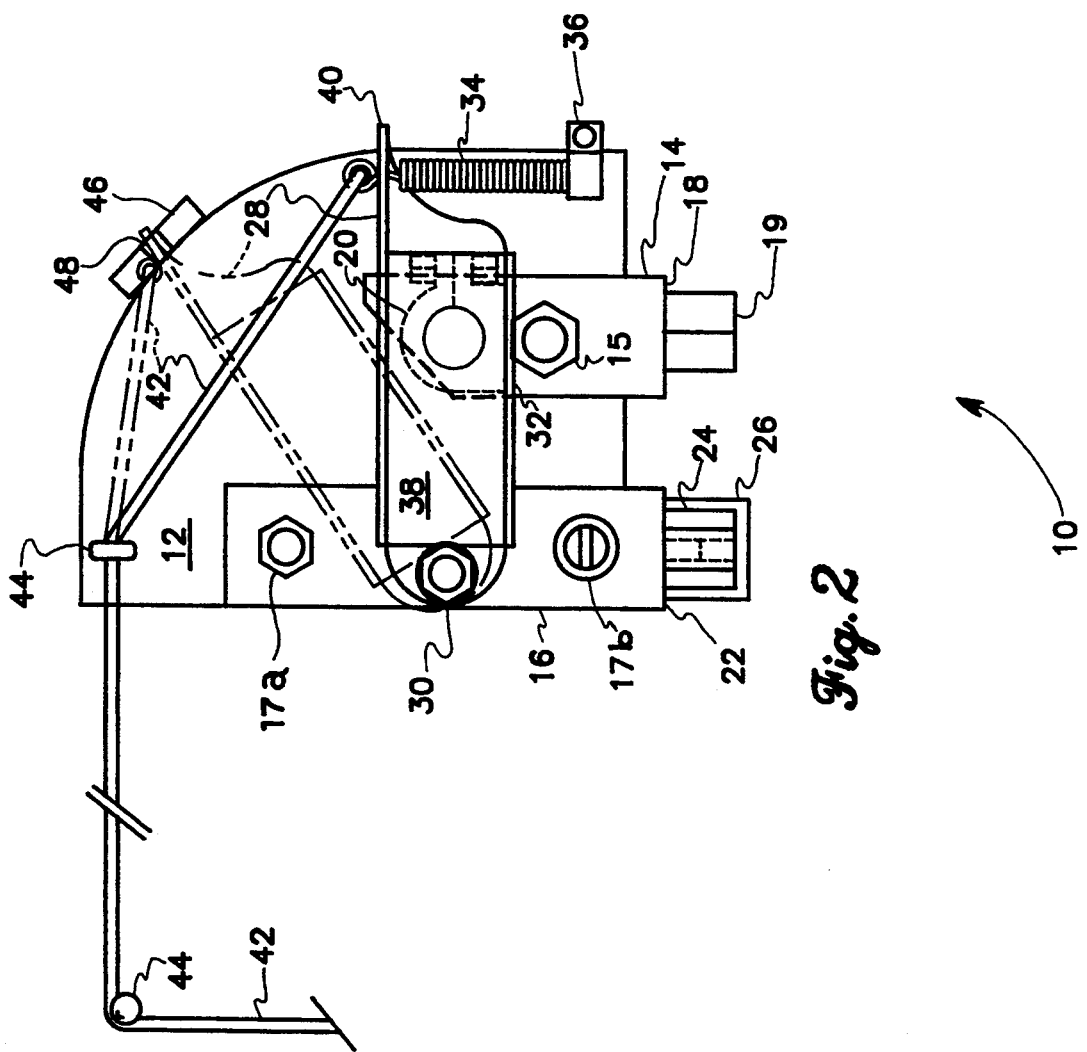

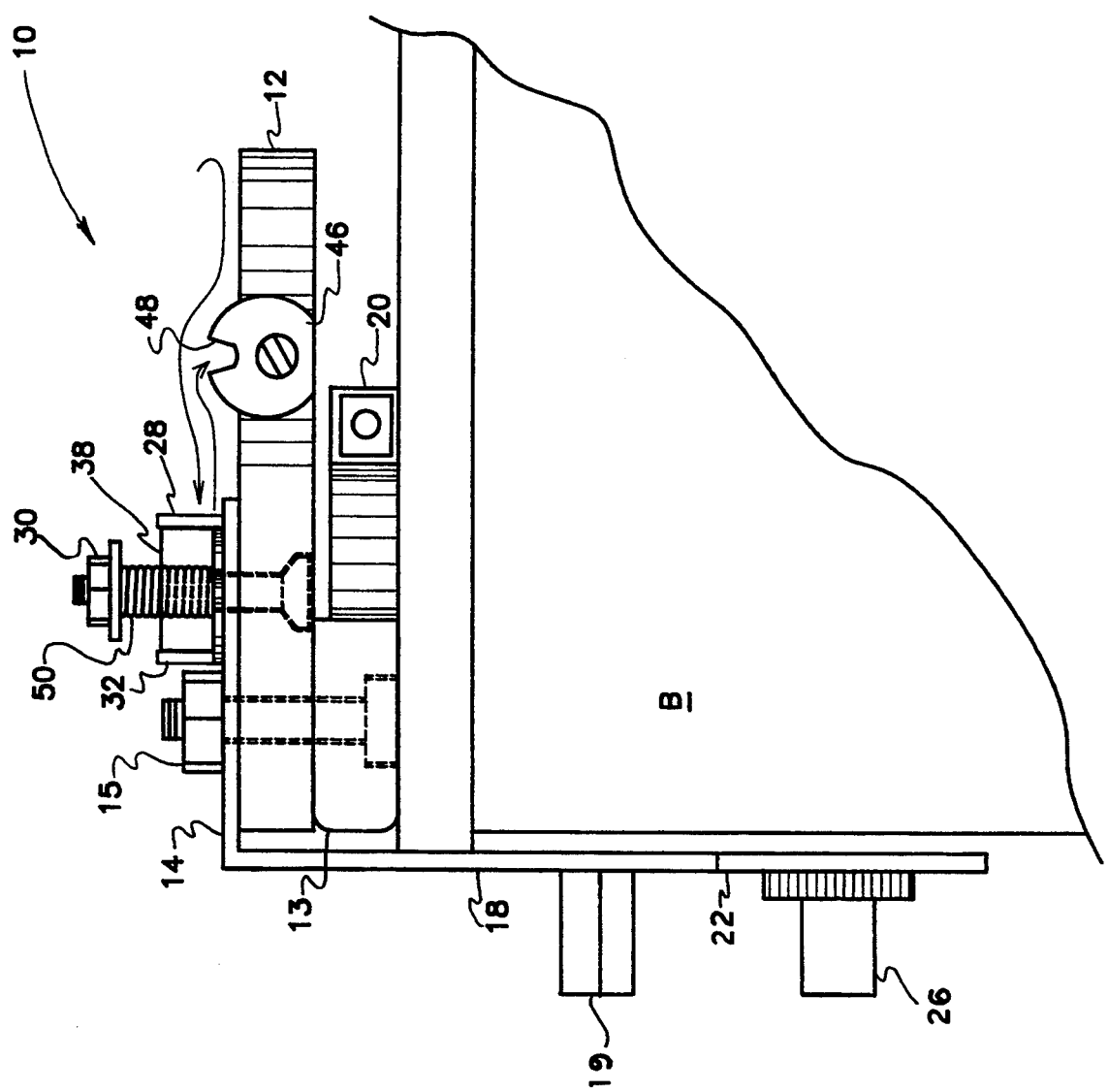

REMOTE BATTERY SWITCH

FIELD OF THE INVENTION

The present invention relates generally to electrical switches, and more specifically to a remotely controlled switch installable directly to one post or contact of an automobile or motor vehicle battery. The switch is mechanically opened and closed by means of a cord or line extending from the switch to the interior of the automobile or motor vehicle.

BACKGROUND OF THE INVENTION

Modern automobiles and other motor vehicles have become increasingly dependent upon at least one electrical storage battery installed therein to provide electrical Dower for various electrical components when the engine is not operating. Many automobiles contain such equipment as clocks, alarm systems, and audio systems with memories for frequency storage, etc., which components can cause a substantial electrical power drain over a lengthy period of inactivity for the vehicle. In fact, many automobiles are equipped with relatively small electrical storage batteries in order to save weight and manufacturing costs, which smaller batteries are even more prone to excessive power losses due to ancillary electrical equipment.

Another relatively recent problem, particularly in major urban areas, is that of "carjacking," wherein a person uses armed or other force to take another person's car or vehicle from them. With no means of disabling the vehicle, the carjacker can easily abscond with the vehicle, as authorities generally recommend that the owner allow the theft to take place rather than risking injury.

One solution to the above problems is to disconnect a battery cable at the vehicle battery, in order to eliminate current draw through various electrical components, including the ignition and starting systems. (Vehicle anti-theft alarm systems are typically intended only for daily or overnight use, due to their relatively high electrical needs.) In the case of a lengthy vehicle storage situation of more than a few days, particularly in a relatively secure area where theft is unlikely, such disconnection may be feasible, but is impracticable when one considers the need to open the hood or trunk and the need for tools to disconnect the battery cable from the battery. This is particularly the case when one is leaving the vehicle in long term parking for a business or other trip, when one is likely to soil one's hands and/or clothing while performing such a task. Insofar as foiling a carjacking is concerned, it is obviously impracticable to leave the vehicle interior, open the hood or trunk, obtain the required tool(s), and disconnect a battery cable, when a criminal is attempting to steal the vehicle.

The need arises for a convenient remote battery switch installable to an electrical terminal or post of the battery, and remotely operable by a cord or line from the switch to the vehicle passenger interior. The switch must provide for positive electrical contact when closed in order to provide maximum current flow for heavy electrical loads (e.g., starter and lights), yet must be easily and quickly disengageable without undue time, effort or any untoward appearance which might lead to suspicion on the part of a carjacker. The switch must also be just as easily and quickly closeable when battery power is again desired for the vehicle.

DESCRIPTION OF THE PRIOR ART

U.S. Pat. No. 3,760,617 issued to Paul A. Westerdale on Sep. 25, 1973 discloses an Anti-Theft Cable Retractor For Hood Latch Release. The apparatus comprises a Bowden cable extending between the vehicle interior and the hood release. No electrical switch is disclosed, and no means for retaining the release in an open position when the tension on the cable is released, is disclosed.

U.S. Pat. No. 3,820,361 issued to Erwin M. Leitner on Jun. 28, 1974 discloses an Automotive Anti-Theft Device comprising a switch remotely mounted from both the battery and the vehicle operator. A mechanical linkage connects the device to the vehicle engine compartment hood, whereby the locking of the hood with the linkage also disables the vehicle electrical system. The device includes locking tumblers at the cable end within the vehicle interior, unlike the present invention. The present invention does not control any mechanical functions or access to any area of the vehicle, and is connected directly to the battery, unlike the Leitner device.

U.S. Pat. No. 4,515,237 issued to Jose Gonzalez et al. on May 7, 1985 discloses an Automobile Security System utilizing an electrical switch in the vehicle passenger interior to selectively connect or disconnect the Ground cable of the battery. The device requires a relatively long run for the battery ground cable, from the battery to the passenger interior, resulting in a relatively high resistance circuit: the device does not connect directly to the battery, as does the present invention. The device also includes a mechanical latch or lock to prevent unauthorized opening of the vehicle engine compartment, unlike the present invention.

Finally, U.S. Pat. No. 4,993,244 issued to Craig Osman on Feb. 19, 1991 discloses a Locking Apparatus For A Cellular Phone comprising a box-like structure providing for the enclosure of a cellular phone therein. The box may be locked in order to secure the phone therewithin. The device is strictly mechanical in nature and provides no electrical switching, nor is it connected in any way to the vehicle battery, as is the present invention.

None of the above noted patents, taken either singly or in combination, are seen to disclose the specific arrangement of concepts disclosed by the present invention.

SUMMARY OF THE INVENTION

By the present invention, an improved remote battery switch for motor vehicles is disclosed.

Accordingly, one of the objects of the present invention is to provide an improved remote battery switch which is installable directly to the battery of a motor vehicle, and which is mechanically remotely controllable by means of a cord or cable communicating with the vehicle passenger compartment.

Another of the objects of the present invention is to provide an improved remote battery switch which is securable to either a post of a top post type battery connection, or to a side mount battery terminal connection.

Yet another of the objects of the present invention is to provide an improved remote battery switch which includes magnetic means to provide for positive contact between the switch contacts for high amperage flow and low resistance.

Still another of the objects of the present invention is to provide an improved remote battery switch which utilizes a two way retaining catch to alternately capture and release the switch arm from its open position, whereby a cord or cable operating in pure tension may be used for the operation of the switch.

A further object of the present invention is to provide an improved remote battery switch which requires no additional structural attachment other than connection to a battery terminal or post, and which allows the actuating cord or cable to be substantially concealed in order to obviate the need for additional locking means.

A final object of the present invention is to provide an improved remote battery switch for the purposes described which is inexpensive, dependable and fully effective in accomplishing its intended purpose.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

FIG. 2 is a top plan view of the present invention, showing the magnetic switch arm in both the open and closed positions.

FIG. 3 is a schematic plan view of the forward portion of a typical motor vehicle, showing the relationship of the present remote switch and control cable or cord therefor.

FIG. 4 is a side view of the present invention as it would be installed upon an electrical battery.

Similar reference characters denote corresponding features consistently throughout the figures of the attached drawings.

DETAILED DESCRIPTION OF THE PREFERRED EMBODIMENT

Figure 1:
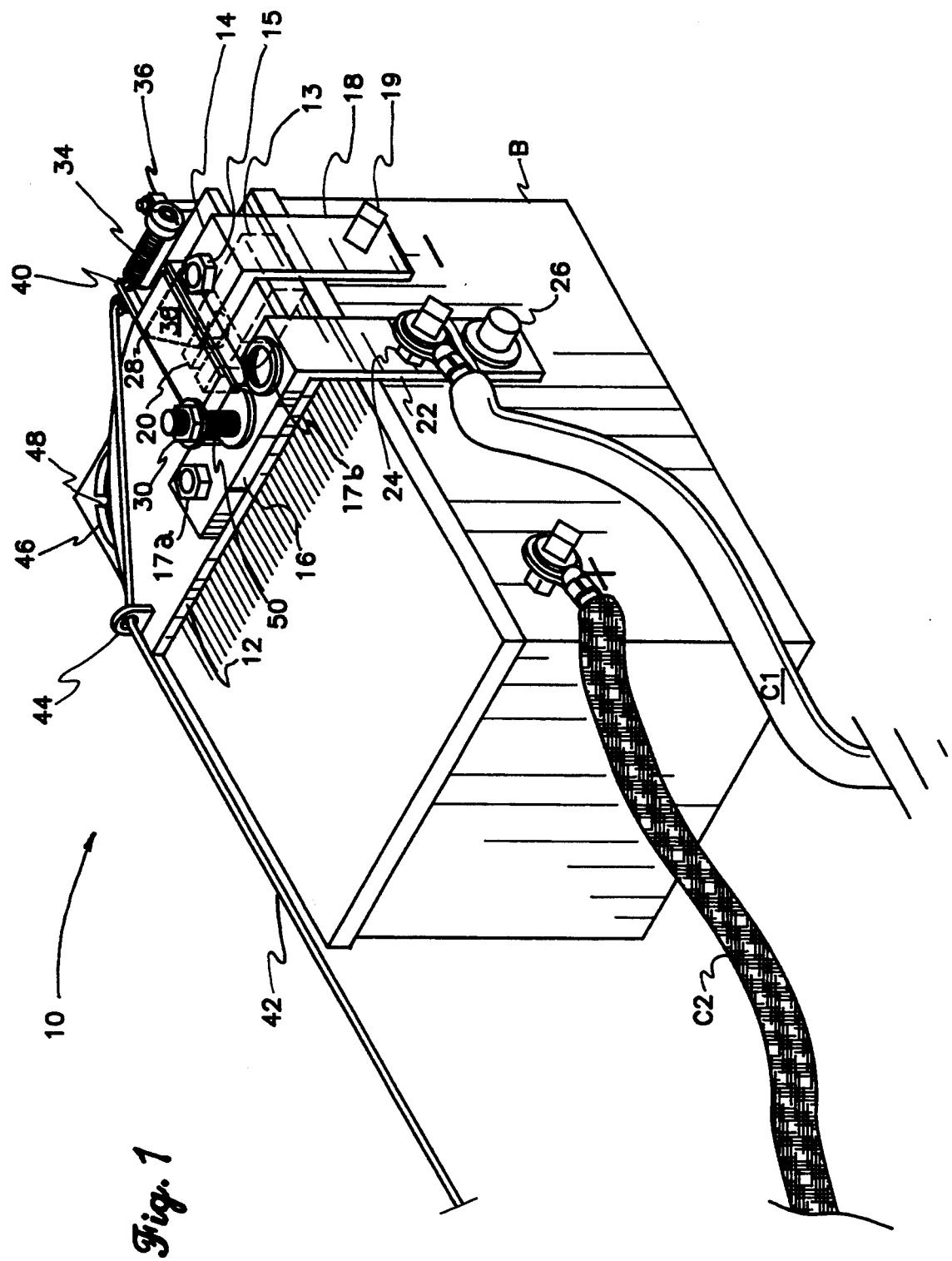
FIG. 1 is a perspective view of the present remote battery switch installed upon a typical side terminal connector type battery, showing its various features and alternative post connector attachment provision.

Referring now particularly to FIG. 1 of the drawings, the present invention will be seen to relate to a remote battery switch 10 providing for the selective opening or closing of the battery circuit of a motor vehicle. Switch 10 includes an electrically insulating base plate 12 which is spaced above the top surface of the battery B by means of a spacer 13. An electrically conductive first or battery attachment terminal 14 and a second or cable attachment terminal 16 are permanently mounted to the base plate 12 respectively by means of fasteners 15 and 17a and 17b.

The battery attachment terminal 14 provides for universal attachment to a typical vehicle battery B having either post type electrical terminals extending from the upper surface of the battery, or threaded side mount terminals. The battery attachment terminal 14 forms a substantially 90 degree L shape with a side terminal connector extension 18 extending downward therefrom, and providing for structural and electrical connection to a side terminal type battery, e.g. by means of attachment lug 19, as shown in FIG. 1. The spacer 13 extending from the battery attachment terminal extension 18 will be seen to include a post clamp 20 extending therefrom, and disposed immediately below the insulating base plate 12. Thus, the present switch may be universally secured to either standard type of vehicle battery B without modification in any way.

The second or cable attachment terminal 16 is similar to the first terminal 14, in that it also includes a substantially 90 degree, L-shaped extension 22 providing both a side mount cable terminal attachment 24, and a post mount terminal attachment 26. Thus, either type of battery cable C may be secured to either of the terminal attachments 24 or 26, depending upon the type of battery B and associated cable C terminal end. While the negative battery cable C1 is shown secured to the second or cable attachment terminal extension 22 and the switch 10 is shown connected to the negative terminal of the battery B in FIG. 1, it will be understood that the switch 10 may be secured to the positive terminal of the battery B if desired, with the positive cable C2 being connected to the cable attachment terminal extension 22, if desired.

The second or cable attachment terminal 16 includes a switch contact 28 pivotally mounted thereto, comprising a flat plate with opposite upwardly extending side walls to form a channel. The switch contact 28 is secured to the second or cable attachment terminal 16 by means of a switch contact fastener 30, and is free to pivot or rotate about that fastener 30 through an arc. The switch contact fastener 30, as well as the base of the switch contact plate bearing against the cable attachment terminal 16, serve to provide an electrical path through the switch contact 28 to the side or post mount cable terminal attachment 24 or 26, as applicable. When the switch contact is in a closed position, as shown in FIG. 1 and in solid lines in FIG. 2, a contact side 32 of the switch contact 28 will be seen to be in physical and electrical contact with the conductive battery attachment terminal fastener 15, which serves as a switch contact for the terminal.

Two means are used to ensure positive contact and electrical current flow when the switch 10 is closed: First, a spring 34 is connected to the switch contact 28 at the end opposite that of the switch contact fastener 30, and serves to urge or draw the switch contact 28 toward the closed position against the battery attachment terminal fastener 15. The spring 34 is secured to the base plate 12 by a fixed spring attachment 36 extending from the base plate 12. Secondly, a magnet 38 is affixed within the channel of the switch contact 28. By providing a battery attachment terminal fastener 15 of magnetically attractive ferrous metal (if not the entire first or battery attachment terminal 14), the magnet 38 is attracted to the battery attachment terminal fastener 15 to ensure positive electrical contact and current flow when the switch contact 28 is in the closed position.

These two means of urging or retaining the switch contact 28 in the closed position are complementary to one another, as the spring 34 will exert the weakest tensile force when it is contracted with the switch contact 28 in the closed position. On the other hand, the magnet 38 provides its strongest attractive force when the switch contact 28 is closed and the magnet 38 is closest to the battery attachment terminal fastener 15. Thus, positive force urging the switch contact toward the closed position and maintaining the switch contact in a closed position unless actively moved therefrom, is assured at all times.

The spring connection end 40 of the switch contact 28 is also connected to a cord or cable 42, which extends from the switch contact 28 through a series of eyelets, guides and/or fairleads 44 to the passenger interior I of the vehicle V, as shown in FIG. 3. This cord/cable 42 provides for the remote operation of switch 10.

When it is desired to open the contacts of the remote switch 10 to cut the electrical power from the battery B to the vehicle electrical circuit, the cord 42 is pulled to withdraw the switch contact 28 from the adjacent battery attachment terminal fastener 15. Initially the magnet 38 will provide the majority of the attractive force resisting the cord 42 pull in comparison to the spring 34, but as the magnetic force is inversely proportional to the square of the distance between the switch contact 28 and the attachment terminal fastener 15, it will be seen that the magnetic force will decrease rapidly to readily disengage the switch contact 28 from the fastener 15 with an initial tug or pull on the cord 42. At that point, it will be seen that the spring 34 tension will provide an increasing closing force as the switch contact 28 is opened further.

Accordingly, means must be provided to hold the switch contact 28 in an open position in order for the person pulling on the cord 42 to be able to release the cord 42 without allowing the switch 10 to close again. This is achieved by means of a double acting catch 46 disposed at the center of the arc defined by the spring connection end 40 of the switch contact 28 in its arcuate travel between the closed and open positions. Catch 46 serves to capture and hold the spring connection end 40 by means of a notched cutout 48 in the top thereof, serving to capture the end 40 of the switch contact 28 when the cord 42 is drawn sufficiently to cause the switch contact spring connection end 40 to engage the notch 48. The tensile force on the cord 42 may then be released, and the catch 46 will retain the switch contact 28 against the substantially opposite tensile force of the spring 34. A clearer disclosure of this operation is shown in FIG. 4.

FIG. 4 shows the catch 46 to be a fixed device with no moving parts. The switch contact 28 is resiliently held in its plane of arcuate movement by a switch contact compression spring 50, secured concentrically about the switch contact fastener 30. Thus, the switch contact 28 is provided with some limited ability to move vertically, as well as arcuately, depending upon the compression developed by the spring 50 as adjusted by the fastener 15 nut. Normally, the compression spring 50 urges the switch contact 28 downward against the adjacent surface of the cable attachment terminal 16. However, as the switch contact 28 is drawn back from its closed position, the spring connection end 40 will be forced upward over the first ramp edge of the catch 46. If the motion of the switch contact 28 is relatively slow, the spring connection end 40 will be forced downward by means of the compression spring 50 and captured by the notch 48 of the catch 40.

However, if the spring connection end 40 of the switch contact 28 passes over the catch 46 relatively rapidly, the end 40 will skip over the notch 48. This action can occur in either direction of travel, but properly, the cord/cable 42 is drawn relatively slowly when the switch 10 is opened, in order to allow the spring connection end 40 of the switch contact 28 to be captured within the notch 48 of the catch 46 and retained therein to hold the switch 10 open. When it is desired to close the switch 10 to provide electrical power from the battery B to the vehicle electrical system, the cord/cable 42 is drawn further against the tension of the spring 34, to cause the spring connection end 40 of the switch contact 28 to be withdrawn from the notch 48 of the catch 46. By releasing the cord/cable 42, the relatively high tension of the spring 34 in this position causes the switch contact 28 to be drawn rapidly toward its closed position, and to skip over the notch 48, thus allowing the switch 10 to close remotely. The magnet 38 within the switch contact 28 channel serves to provide positive contact with the adjacent battery terminal fastener 15 when the switch contact is released to assume a closed position.

It will be noted that the above operation requires no compressive or pushing forces in order to open or close the switch 10; the cord 42 always operates in tension, against the opposite tensile force of the spring 34 and magnet 38. This results in a much simpler and lighter control system, as the cord or cable 42 may be passed through any suitable openings along the fender or other structure of the vehicle V, and into the interior I to terminate at a point providing for convenient and unobtrusive access by the vehicle operator. The unobtrusive appearance of a relatively short end of cord or the like beneath the dash or instrument panel of the vehicle V, is unlikely to attract attention from persons unaware of the present battery cutout switch 10 and its installation.

While it may be desirable to maintain electrical power to a vehicle electrical system in order to keep a vehicle alarm system activated, the disconnection of the electrical system may be desirable for relatively long term storage of the vehicle V. The present switch 10 readily provides for such disconnection by merely pulling on the cord 42 terminating in the interior I of the vehicle V, to retain the switch contact 28 by means of the double acting catch 46. Another tug on the cord 42 serves to release the catch 46, allowing the switch to close due to the tensile force of the spring 34 and magnet 38 and return power to the vehicle electrical system.

The present switch 10 and cord 42 actuation system can be of particular value in the event of an attempted carjacking. The vehicle owner or operator need only give a quick and unobtrusive tug to the cord 42 end in the vehicle interior I in order to disconnect the battery B from the electrical system, thereby disabling the vehicle on the spot and frustrating a potential carjacker and vehicle theft. When the theft hazard is over, another tensile tug on the end of the cord 42 serves to release the catch 46 and allow the switch contact 28 to close, thereby restoring electrical power to the vehicle V.

It is to be understood that the present invention is not limited to the sole embodiment described above, but encompasses any and all embodiments within the scope of the following claims.

I claim:

1. A remote battery switch for motor vehicles having an electrical storage battery, said switch comprising:
    an electrically insulating base plate having an electrically conductive battery attachment terminal and an electrically conductive cable attachment terminal extending therefrom;
    said battery attachment terminal including means providing for the direct attachment of said switch to an electrical battery disposed immediately adjacent thereto;
    said cable attachment terminal including an electrically conductive switch contact pivotally attached thereto, with said switch contact comprising means for the electrical connection of said cable attachment terminal with said battery attachment terminal when said switch contact is in a closed position;

said switch contact including a spring connection end having a spring connected thereto, with said spring further being affixed to said base plate and providing a tensile force urging said switch contact to a closed position;

a double acting catch secured to said base plate and positioned to engage said spring connection end of said switch contact, with said catch providing means for the retention and release of said spring connection end of said switch contact, and;

a cord having a first end secured to said spring connection end of said switch contact and an opposite second end terminating at a location remote from said first end, with said cord providing means for the application of purely tensile force for the electrical disconnection and connection of said switch, whereby;

a tensile force is applied to said second end of said cord to pull said switch contact clear of said battery attachment terminal to open said electrical connection, and said double acting catch retainingly engages said spring connection end of said switch contact to hold said switch contact in an open position until a second tensile force is applied to said second end of said cord, to cause said double acting catch to release said spring connection end of said switch contact and said spring pulls said switch contact into a closed circuit position against said battery attachment terminal.

2. The remote battery switch of claim 1 wherein:

said switch contact comprises a channel configuration including a magnet therein, and said battery attachment terminal includes at least a switch contact portion formed of ferrous magnetic metal, whereby;

said magnet is attracted to said ferrous magnetic metal switch contact portion to provide positive closure and electrical current flow when said switch is closed.

3. The remote battery switch of claim 1 wherein:

said switch secures directly to a battery by means of a single attachment to one battery terminal, and is devoid of additional structural and electrical battery attachments.

4. The remote battery switch of claim 1 including:

means providing for the universal attachment of said remote battery switch to a battery having either top post terminals or side terminals.

5. The remote battery switch of claim 1 wherein:

said double acting catch includes a notch therein and is disposed at least partially within an arc defined by movement of said switch contact, and;

said switch contact fastener includes a spring thereon serving to resiliently urge said switch contact against said cable attachment terminal, whereby;

said spring connection end of said switch contact is displaced from an arcuate path upon contacting said double acting catch, and said spring connection end of said switch contact is captured and retained within said notch of said double acting catch by means of said switch contact fastener spring, and is further released by means of further tensile pull upon said cord.

6. The remote battery switch of claim 1 wherein:

said battery attachment terminal and said cable attachment terminal each include an extension, with each said extension respectively being at a substantially right angle to said battery attachment terminal and said cable attachment terminal.

7. The remote battery switch of claim 6 wherein:

said battery attachment terminal includes a terminal post clamp adaptable to a battery top post, with said battery attachment terminal extension including a side terminal connector adaptable to a battery side terminal, and;

said cable attachment terminal extension includes both a side mount cable terminal attachment and a post mount cable terminal attachment, whereby;

said remote battery switch provides for universal connection to a battery having top post terminals by means of said terminal post clamp of said battery attachment terminal and said post mount cable terminal attachment of said cable attachment terminal extension, and further provides for connection to a battery having side mount terminals by means of said side terminal connector of said battery attachment terminal extension and said side mount cable terminal attachment of said cable attachment terminal extension.

* * * * *